Nov. 26, 1963 A. E. PECH 3,112,205
METHOD OF PREPARING EVAPORATED MILK BY TWO-STAGE STERILIZATION
Filed Nov. 17, 1960
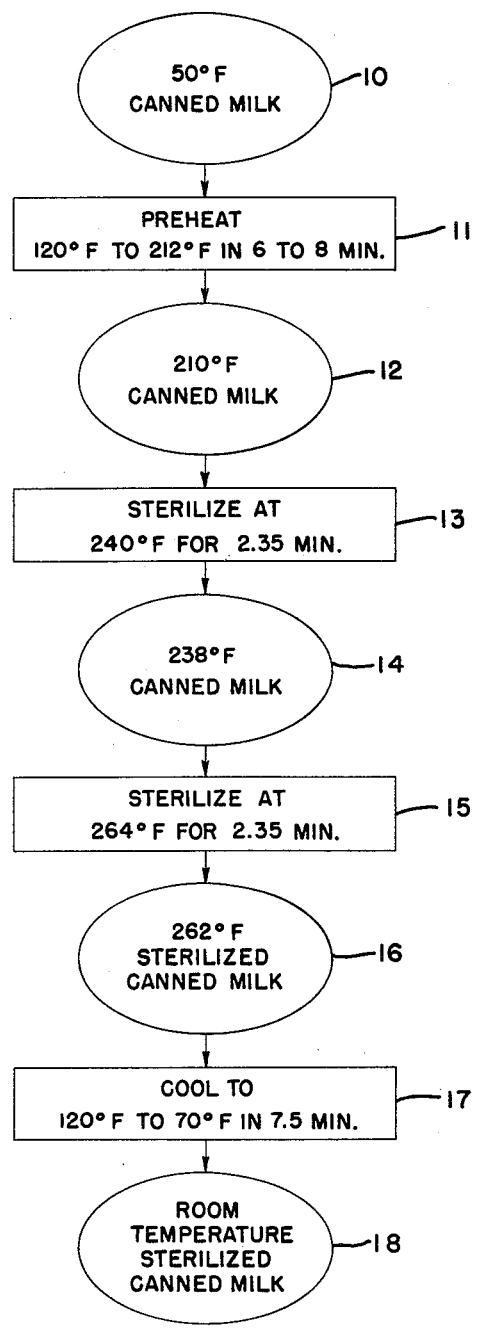
INVENTOR
ALLISON E. PECH United States Patent Office 3,112,205
Patented Nov. 26, 1963

3,112,205
METHOD OF PREPARING EVAPORATED MILK
BY TWO-STAGE STERILIZATION
Allison E. Pech, San Jose, Calif., assignor to FMC
Corporation, a corporation of Delaware
Filed Nov. 17, 1960, Ser. No. 69,908
10 Claims. (Cl. 99—214)

This invention relates to methods of preparing evaporated milk and similar products for preservation in sealed containers.

Evaporated milk which is to be preserved in cans must be sterilized to kill substantially all the spoilage bacteria therein. Sterilization is usually accomplished by subjecting the cans of milk to a 240° F. environment for a time which will be lethal to substantially all the spoilage bacteria. It is well known that the ability of milk to be not adversely affected by extended heat-treatment is influenced by many factors such as the breed of dairy cattle supplying the milk, the feed, the season of the year, and other factors. Milk having a low "heat sensitivity" will, when heat-treated, soon turn a darker color, acquire a cooked flavor, and undergo other physico-chemical property changes which affect its stability during storage. Milk having a high "heat sensitivity" will have less tendency to be affected by heat-treatment in the above described manner.

The thermal death time for spoilage bacteria is a function of temperature as well as time. Using a 220° F. environment it requires several hours to produce a commercially sterile product while in a 242° F. environment it requires 15 minutes and in a 260° F. environment it requires 2 minutes. The use of a high-temperature short-time process has obvious cost advantages for commercial milk processing applications because of the large time savings, and this process provides the added advantage that the milk retains its natural white color and does not acquire an objectionable cooked flavor.

Conventional high-temperature short-time continuous processes include the steps of preheating the milk to a temperature of 200°–210° F. and then sterilizing the milk by placing the cans of 200°–210° F. milk in a fluid maintained at a temperature of 242°–250° F. The temperature of the metal surfaces of the cans immediately rises to the 242°–250° F. temperature and as a result, the milk which contacts the can interior surface will be immediately burned. This burning, which is known as "burn-on" and is evidenced by deposits of non-fat milk solids sticking to the can surfaces, causes objectionable changes in composition, flavor, and other physico-chemical properties. These deposits or "burn-on," even when present in very minute quantities as an extremely fine film, are regarded by the trade as being seriously objectionable.

Burn-on can be prevented by ensuring that the can temperature never exceeds the milk temperature by more than approximately 35° F. for milk of low burn-on susceptibility and never by more than approximately 25° F. for milk of great burn-on susceptibility. This temperature differential is controlled in continuous processes by requiring a longer time to come up to the final sterilization temperature. Resort to this expedient, however, often means that the color and flavor advantages of a high-temperature short-time process are no longer attainable because of the adverse effects of the prolonged heat treatment.

If milk color and milk flavor were the only factors to be considered in selecting a time and temperature for effecting sterilization, then the process would be carried out under extremely high-temperature short-time conditions, because under such conditions the natural flavor and color are only slightly affected. Milk sterilized by a high-temperature short-time process, however, tends to have a thin body and deteriorates rapidly in storage. The storage of this thin bodied product will often result in the fat portion and the serum portion separating into two distinct layers in the can. Age thickening or gelation is another form of deterioration which may occur in this milk during prolonged storage. The ability of canned milk to withstand prolonged storage without these adverse changes occurring is known as the "storage stability" of milk. It is known in the trade that the storage stability of canned milk is appreciably improved by heat treating the milk to cause an increase in its viscosity. Heretofore, viscosity increases have been effected by prolonged heat treatment at a temperature which was not to any large extent lethal to spoilage bacteria. Such prolonged methods of milk processing use high killing temperatures but required a protraction of the total processing time which is costly and adversely affects color and flavor as discussed above. In accordance with this invention, a desirable increase in the milk viscosity is effected by a short-time heat treatment at a temperature which produces a partial sterilization of the product. Final sterilization is achieved in a short time in a higher temperature sterilizing unit. Accordingly, with the present method, a high viscosity sterile product is produced in a very short time.

An object of the invention is to provide an improved method of heat-treating evaporated milk.

Another object of the invention is to provide a method of processing evaporated milk which has the color, cost and flavor advantages of a high-temperature short-time process and does not cause burn-on.

Another object of the invention is to provide an improved method of processing canned evaporated milk which results in an increase in the milk viscosity.

These and other objects and advantages of the invention will be apparent from the following description and the single drawing which is a flow-chart illustrating the several steps of the process of the present invention.

The canned evaporated milk or other product containing milk 10 is at approximately 50° F. when introduced into the process. The line of cans are moved continuously through one unit and into the next during the heat-treatment of the milk. The cans are first placed in a water-bath preheater 11 which has several heating zones maintained at temperatures ranging from a low temperature of 120° F. to a high temperature of 212° F. The water in the preheater 11 is steam heated and is exposed to the atmosphere; therefore, the highest water temperature achieved in the preheater is 212° F. The cans pass through the preheater 11 in approximately 7 minutes, i.e., within the range of 6 to 8 minutes, and in this time the milk temperature will rise to approximately 210° F.

The cans of 210° F. milk 12 are next placed in a first sterilizer unit 13 containing pressurized steam at a temperature ranging from 235° F. to 240° F. It will be noted that the temperature differential between unit 11 and unit 13 can be adjusted to prevent burn on occurring with milk of either high or low heat-sensitivity. A can of milk passes through the first sterilizer unit 13 in approximately 2.35 minutes. After 2.35 minutes in the unit 13, the milk temperature will have risen to approximately 238° F. The 240° F. steam medium in the first sterilizer is effective to partially sterilize the milk. The $Fo$ value for the milk equals approximately .8 following the sterilizer unit 13, where $Fo=4.7$ has been determined as the value indicating commercial sterility. Therefore, following the sterilizing unit 13, the sterility is less than half the desired sterility. It has been determined that subtle chemical changes, which cause a subsequent desirable increase in the viscosity of the milk, are produced in the product during the time it is in the first sterilizer unit 13.

The cans of 238° F. milk 14 are next fed into a second or final sterilizer unit 15 containing pressurized steam at a temperature ranging from 260° F. to 264° F. The temperature differential between unit 13 and unit 15 can also be adjusted to prevent burn-on from occurring in the cans. The cans of milk 14 pass through the final sterilizer unit 15 in approximately 2.35 minutes, and this length of time is sufficient to produce a product having an $Fo=4.7$. It has been determined that the changes that cause increased viscosity and are produced in the first sterilizer 13, are augmented by further changes which occur during the time the milk is in the second sterilizer 15. The processing times and temperatures are so chosen that the second sterilizer complements the first and produces a product having a viscosity at the desired high level. After 2.35 minutes in the final sterilizer unit 15 the milk temperature will have risen to approximately 262° F.

The cans of 262° F. milk 16 are next fed into a pressurized-water-bath cooler 17 which contains water in a temperature range of 120° F. to 70° F. A can of milk passes through the cooler 17 in approximately 7.5 minutes and in this time the temperature of the milk is reduced to room temperature or approximately 100° F. The cans of commercially sterile, room-temperature milk 18 are removed from the cooler 17 and handled as desired.

The equipment disclosed in U.S. Patent No. 2,536,115 can readily be used in practicing the method of this invention.

It will be understood that modifications and variations may be effected without department from the method of the present invention.

The invention having been described, that which is claimed to be new and which is desired to be protected by Letters Patent is:

1. The method of heat-treating canned evaporated milk which comprises the steps of preheating the milk in a 212° F. medium, subjecting the milk to a 240° F. first sterilizing medium for approximately 2.35 minutes to partially sterilize the milk and develop the viscosity thereof, subjecting the milk to a 264° F. second sterilizing medium for approximately 2.35 minutes to achieve final sterilization, and rapidly cooling the milk to room temperature.

2. The method of heat-treating evaporated milk in a can which comprises the steps of preheating the milk to a temperature of approximately 210° F. in approximately 7 minutes, partially sterilizing the milk by heating it to approximately 238° F. in approximately 2.35 minutes, completing the sterilization of the milk by heating it to approximately 262° F. in approximately 2.35 minutes, and rapidly cooling the milk to room temperature.

3. The method of heat-treating canned evaporated milk which comprises the steps of preheating the milk in a steam-heated water bath to a temperature of approximately 210° F., heating the milk to approximately 238° F. in approximately 2.35 minutes in a first pressurized-steam sterilizing medium, heating the milk to approximately 262° F. in approximately 2.35 minutes in a second pressurized-steam sterilizing medium, and cooling the milk in a pressurized-water-bath to a temperature in the range 100° F.

4. The method of heat-treating canned evaporated milk which comprises the steps of preheating the milk in a steam-heated water bath to a temperature of approximately 210° F. in approximately 7 minutes, partially sterilizing the milk by heating it to approximately 238° F. in approximately 2.35 minutes in a first pressurized-steam sterilizing unit, completing the sterilization of the milk by heating it to approximately 262° F. in approximately 2.35 minutes in a second pressurized-steam sterilizing unit, and cooling the milk in a pressurized-water-bath cooler to a temperature in the range of 100° F. in approximately 7.5 minutes.

5. The method of heat-treating canned evaporated milk which comprises the steps of preheating the cans of milk in a 212° F. water bath for approximately 7 minutes, subjecting the cans of milk to a 240° F. first pressurized-steam sterilizing medium for approximately 2.35 minutes, subjecting the cans of milk to a 264° F. second pressurized steam sterilizing medium for approximately 2.35 minutes, and rapidly cooling the cans of milk in a 70° F. pressurized-water-bath.

6. The method of heat-treating canned evaporated milk without causing a temperature difference between the metal can and the milk therein greater than approximately 30° F., comprising the steps of preheating the milk to 210° F., placing the canned milk in a medium which is approximately 30° F. hotter than the preheated milk for approximately 2.35 minutes to raise its temperature to approximately 238° F. to partially sterilize the milk and effect an appreciable increase in its viscosity, placing the partially sterilized canned milk in a medium which is approximately 26° F. hotter than said partially sterilized milk for approximately 2.35 minutes to produce 262° F. sterilized canned milk, and cooling the sterilized milk.

7. In a two-stage process of sterilizing canned evaporated milk, the steps of preheating the canned milk to a temperature of approximately 210° F., partially sterilizing said preheated milk by increasing the temperature of the preheated milk to approximately 238° F. thereby also causing an appreciable increase in the viscosity of the milk, and completing the sterilization of the partially sterilized milk in a second stage by increasing the temperature of the partially sterilized milk to approximately 262° F.

8. A method of sterilizing preheated evaporated milk in a can so as to impart a desired $Fo$ sterility value of 4.7 to the milk comprising the steps of subjecting the can of milk to a first steam pressure environment wherein the temperature of said environment exceeds the temperature of the preheated milk by no more than about 35° F., maintaining the can of milk in said first environment until the sterility of said milk is less than half of said desired sterility, subjecting said can of partially sterilized milk to a second steam pressure environment wherein the temperature of said environment exceeds the temperature of said partially sterilized milk by no more than about 35° F., and maintaining the can of milk in said second environment until the sterility of said milk equals said desired $Fo$ sterility value of 4.7.

9. In a two-stage process of sterilizing canned evaporated milk, the steps of preheating the canned milk in a medium wherein the temperature is in the range of 120° F. to 212° F., subjecting the preheated milk to a first stage of sterilization in a steam atmosphere wherein the temperature of the milk is raised above the preheated temperature for a time sufficient to yield an $Fo$ value of approximately 0.8, and subjecting the partially sterilized milk to a second stage of sterilization in a steam atmosphere wherein the temperature of the milk is raised to a temperature higher than the first stage temperature and for a time sufficient to increase the $Fo$ value of the partially sterilized milk to approximately 4.7.

10. The method of heat-treating canned evaporated milk which comprises the steps of preheating the canned milk to approximately 210° F., subjecting the preheated milk to a heating medium whose temperature is in a range from 235° F. to 240° F. to raise the temperature of the milk to within approximately 2° F. of the temperature of the heating medium to impart an appreciable increase in the viscosity of milk and to preclude burn-on while partially sterilizing the milk, and subjecting the partially sterilized milk to a heating medium whose temperature is in a range from 260° F. to 264° F. to again preclude "burn-on" while heating the milk to within approximately 2° F. of the temperature of the heating medium and completing sterilization of the milk.

References Cited in the file of this patent
UNITED STATES PATENTS

| | | |
|---|---|---|
| 2,603,568 | Nelson | July 15, 1952 |
| 2,860,057 | Wilcox | Nov. 11, 1958 |
| 2,892,723 | Pech | June 30, 1959 |